United States Patent [19]

Navarro, Sr. et al.

[11] Patent Number: 4,880,217
[45] Date of Patent: Nov. 14, 1989

[54] ANNULAR SPRING DESIGN

[75] Inventors: Joseph Navarro, Sr., 300 E. Baltimore Pike, Clifton Heights, Pa. 19018; Joseph Navarro, Jr., Vineland, N.J.

[73] Assignee: Joseph Navarro, Sr., Clifton Heights, Pa.

[21] Appl. No.: 223,544

[22] Filed: Jul. 25, 1988

[51] Int. Cl.[4] .................................. F16F 1/04
[52] U.S. Cl. ................... 267/167; 140/71 R; 140/112
[58] Field of Search ............... 228/135, 173.5; 29/227; 267/167; 140/71 R, 112, 71 C

[56] References Cited

U.S. PATENT DOCUMENTS

| 863,034 | 8/1907 | Mason | 267/167 |
|---|---|---|---|
| 2,400,319 | 5/1946 | Tallion | 29/227 |
| 2,991,064 | 7/1961 | DeJean | 267/167 |
| 3,186,701 | 6/1965 | Skinner, Sr. | 267/167 |
| 3,190,633 | 6/1985 | Jack | 267/167 |
| 3,276,761 | 10/1946 | Becker | 267/167 |
| 3,359,617 | 12/1967 | Baumler | 267/167 |
| 3,468,527 | 9/1989 | Mather | 267/167 |
| 3,526,410 | 2/1969 | Kirchgasser | 29/227 |
| 4,313,474 | 2/1982 | Nazet et al. | 140/71 R |

Primary Examiner—Kenneth J. Ramsey
Attorney, Agent, or Firm—Lipton, Famiglio & Elman

[57] ABSTRACT

This invention is an annular or garter spring having a welded overlapping region. In this invention, the end tips of a straight spring fit within the spaces between coils at the opposite end of the spring. This result is reached by first hooking an end tip of the spring through the first whole coil at the opposite end of the spring, then placing the opposing end tip between the first and second full coils of the first side of the spring. The coils at the ends of the spring are then clamped to so that each end tip aligns alongside the first full coil of the opposite end of the spring. When that position is reached, the spring will form a virtually perfect ring, and the intertwined coils may be welded together to maintain the garter spring shape.

17 Claims, 2 Drawing Sheets

FIG.(4b)

ANNULAR SPRING DESIGN

BACKGROUND OF THE INVENTION

This invention relates to springs, particularly to garter springs.

A garter spring is annular. By definition, a garter spring is enclosed on itself, so that the spring is a resilient band having continuous tension. Such springs are used for a variety of applications.

Several methods of making garter springs are currently in practice, each of which has certain disadvantages. In one method, one end of a straight spring is screwed inside the other end (see, for example, Mason, U.S. Pat. No. 863,034). This threading method requires the spring to be formed so that the outside diameter of the coils at one end is smaller than at the other end. The outside diameter of the coils from the smaller end, however, must be greater than the inside diameter of the coils from the larger end to make the joint secure. A secure connection requires at least three coils from each end.

This threading method is fraught with problems. First, the method of connection causes an inaccuracy because it expands the outside diameter of the spring at the joint. Second, since a secure connection requires at least three coils from each end, the spring properties of at least six coils are destroyed. Third, since it takes at least three unwinding turns to screw together the minimum of three coils, shorter springs will be permanently distorted. Fourth, vibrations or handling may cause the ends to unscrew.

Another variation of the threading method is taught by Becker, U.S. Pat. No. 3,276,761. In Becker's patent, one coil of the inserted smaller end projects outwardly to fit between coils of the larger end. This method improves only slightly over the prior art, as it relies on the projecting coil to hold the spring in place. Moreover, it requires coils to be prestressed, with variations in the extent to which coils are to be prestressed.

Another variation is taught by Skinner, U.S. Pat. No. 3,186,701. Skinner's patent requires the relatively difficult task of grinding the outer periphery of each coil of the spring. This method involves a lot of work, weakens the spring, and may be inappropriate for certain applications.

Another method of forming an annular spring is to weld together the tip ends of a straight spring. This method was employed by Mather, U.S. Pat. No. 3,468,527. In this method, the point of attachment is only as strong as the small weld between the tips. The tips may also be difficult to line up for this procedure, leaving the pitch between the coils at the point of attachment different from the rest of the spring. Additionally, Mather's spring requires variations in pitch and can only be used for loading in a predetermined direction. Garter springs, however, must often be used where the direction of the load is not predetermined.

Another method disclosed in the prior art requires use of a tube-like coupling. To form a garter spring using this method, each end of a straight spring is threaded through the tube-like coupling. (Jack, U.S. Pat. No. 3,190,633). This method may be impractical, because it requires close threading of relatively small parts.

SUMMARY OF THE INVENTION

The present invention provides a garter spring and a method of making garter springs that have never previously been disclosed. In this invention, one coil from one end of the straight spring overlaps a coil from the opposite end, so that the tension in the overlapping coils causes them to pull towards one another. The overlapping coils are welded together by one or more spot welds, making the spring form a nearly perfect ring.

This design has several advantages. First, because the coils overlap, the connection does not depend solely upon the strength of the weld, as do some prior art designs. Second, the diameter of the coils remains the same throughout, giving the spring virtually even strength throughout. In tests by the inventors, the point of connection was found to have the same size and strength as the rest of the spring, within close tolerances. Third, because one end of the spring is not threaded inside the other, as in the prior art, the ends will not come apart due to vibrations as occurs in the prior art. Fourth, the point of connection requires only one coil from each end, thus preserving the spring properties of the coils. Fifth, this design may be used with springs having wide-pitched coils, which ordinarily cannot be threaded together. Sixth, this design allows garter springs of much smaller overall diameter than were previously available in the prior art.

This invention also discloses novel methods for making garter springs. In these new methods, the tip of a first end of a straight spring is hooked through a coil of the opposite end. Likewise, the tip of the second end is hooked between coils of the first end. The coils are then clamped together so that the spring forms a ring, and then welded. With this method, a straight spring of virtually any length may be converted to a garter spring, with no variations in pitch or coil diameter required.

Accordingly, a first object of this invention is to provide a garter spring having a stronger point of connection than has been previously available.

A second object of the invention is to provide a garter spring having virtually uniform coil diameter.

A third object of the invention is to provide a garter spring having relatively uniform strength throughout.

A fourth object of the invention is to provide a garter spring having virtually uniform pitch between coils throughout.

A fifth object of this invention s to provide a garter spring that does not fall apart due to vibrations.

A sixth object of this invention is to provide a method of making garter springs from straight springs of any size.

A seventh object of this invention is to provide a method of making garter springs that does not require variations in pitch between spring coils.

An eighth object of this invention is to provide a method of making garter springs that does not require variations in the diameter of the coils of the spring.

DETAILED DESCRIPTION OF THE PREFERRED EMBODIMENT

Figure 1:
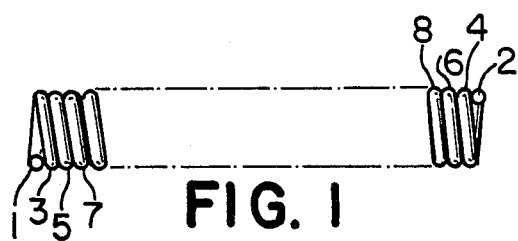
FIG. 1 is a plan view of an ordinary straight spring.

FIG. 1 shows an ordinary straight spring. This spring will be turned into a garter spring using end tips 1 and 2 and coils 3 and 4. Coils 5, 6, 7, and 8 are also identified.

Figure 2:
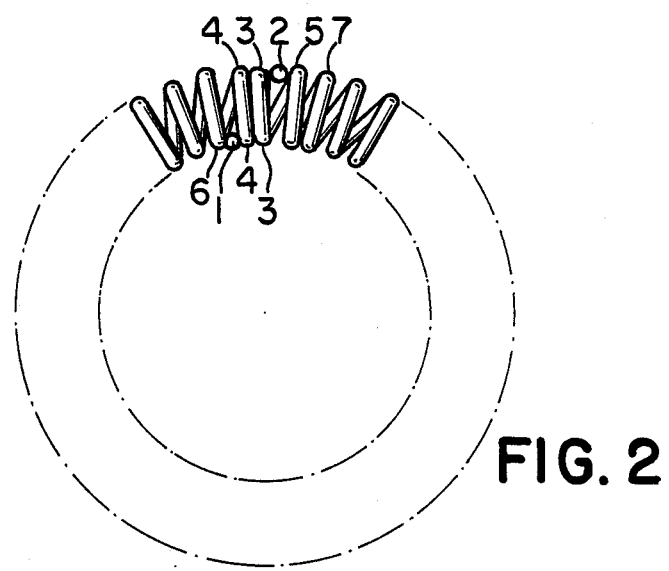
FIG. 2 is a plan view of a garter spring made from a straight spring, showing how the coils of the straight spring intertwine to form the garter spring connection.

FIG. 2 shows the position of end tips 1 and 2 and coils 3, 4, 5, 6, 7, and 8 when the straight spring has been turned into a garter spring. As shown in FIG. 2, end tip 1 lies between coils 4 and 6, and end tip 2 lies between coils 3 and 5. Only one coil from each end is necessary.

Figure 3:
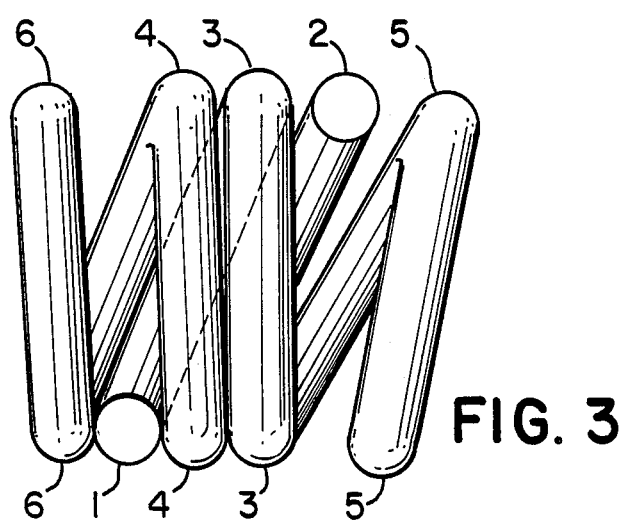
FIG. 3 is a closer view of the point of connection between the ends of the spring shown in FIG. 2.

FIG. 3 gives a closer view of the area of connection. As shown in FIG. 3, one end of the spring does not fit inside the other end in the nut-and-bolt arrangement disclosed in the prior art. Instead, end tip 1 fits alongside coil 4 in the space between coils 4 and 6. Likewise, end tip 2 fits between coils 3 and 5. The diameter of the coils at the point of connection is the same as at all other points along the spring.

Spot welds 9 and 10 help keep the spring in place. They may be placed anywhere along coils 3 and 4 and end tips 1 and 2. In FIG. 3, spot welds 9 and 10 are shown joining coils 3 and 4.

Figure 4A:
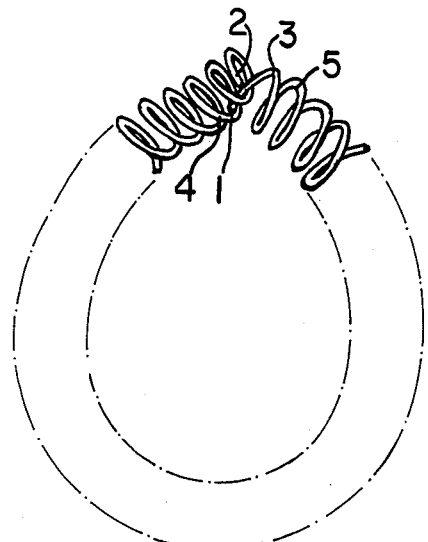
FIGS. 4(a), (b), (c), and (d) show the method of making the garter spring disclosed herein from an ordinary straight spring.
Figure 4C:
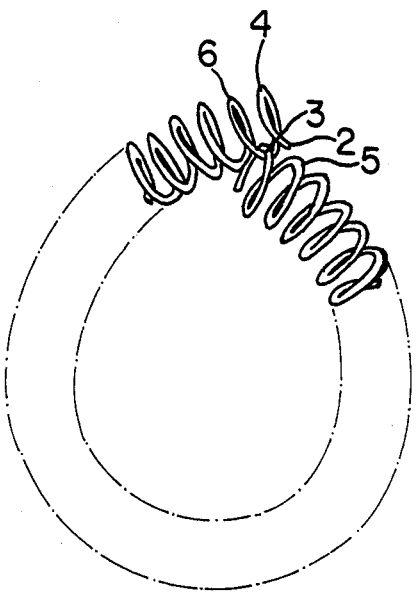
Figure 4C:
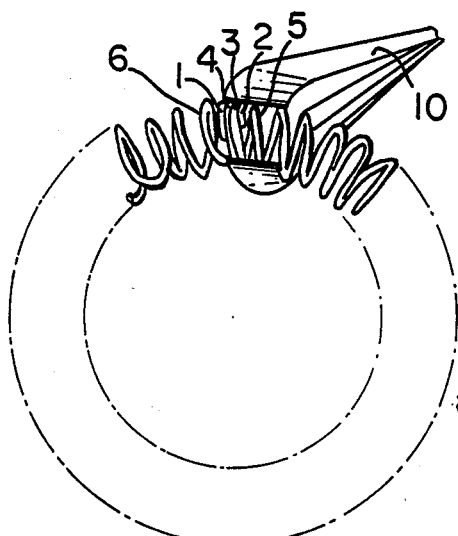
Figure 4D:
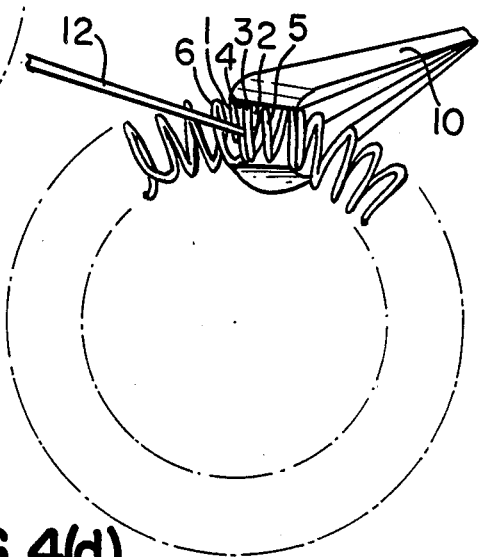

FIGS. 4(a), (b), (c), and (d) demonstrate a preferred method of making the garter spring design of the present invention from a straight spring. In FIG. 4(a), end tip 1 is hooked around coil 4. End tip 1 is then pushed through coil 4 until end tip 2 is adjacent the space between coils 3 and 5, as shown in FIG. 4(b). Alternatively, one could hold end tip 1 steady and move the other side of the spring so that end tip 2 is adjacent the space between coils 3 and 5. Then, as shown in FIG. 4(c), coils 3 and 4 are clamped by clamp 10 until end tips 1 and 2 lie alongside coils 4 and 3, respectively, which occurs when the spring forms a virtually perfect ring. The coils may be clamped by hand or, in a preferred method, by tweezers or pliers. After the coils are clamped in place, they may be joined together as in FIG. 4(d), which shows welding rod 12. In alternative embodiments, the coils may be soldered or glued rather than welded.

Using the method described above, one may produce with little difficulty the garter spring described in FIGS. 1, 2, and 3.

There are various changes and modifications that may be made to applicant's invention, as would be apparent to those skilled in the art. However, any of those changes and modifications are included in the teachings of applicant's disclosure, and it is intended that the invention be limited only by the scope of the claims appended hereto.

What is claimed is:

1. An annular spring formed from a straight spring, comprising:
    (a) an intertwining region where an end coil from a first end of the straight spring is intertwined with a coil near a second end of the straight spring, with each said end coil aligning with the annular spring's inside and outside diameter;
    (b) at least one spot weld joining said end coil from first end of said spring to coil near the second end; so that the tension in each said end coil pulls against the tension in the opposite end coil.

2. The annular spring of claim 1, wherein a plurality of coils near the first end of the straight spring are intertwined with a plurality of coils near the second end of the straight spring.

3. The annular spring of claim 1, wherein said coil near the second end of the straight spring is a first coil away from the second end of the straight spring.

4. A method of making an annular spring, comprising the steps of:
    (a) hooking a first end tip of a straight spring around a coil near a second end tip of the straight spring;
    (b) placing the second end tip between coils near the first end tip;
    (c) clamping the coils near each end tip so that the spring forms an annulus; and
    (d) joining the first full coil away from the first end tip to the first coil from the second end tip.

5. A method of forming an annular spring, comprising the steps of:
    (a) hooking a first end tip of a straight spring around a coil near a second end tip of the straight spring;
    (b) pushing the first end tip between coils near the second end tip until the second end tip is adjacent coils near the first end tip;
    (c) clamping the coils near each end tip so that the spring form an annulus; and
    (d) joining at least one coil near the first end tip to at least one coil near the second end tip.

6. The method of claim 4, wherein said clamping step is performed with tweezers.

7. The method of claim 5, wherein said clamping step is performed with tweezers.

8. The method of claim 4, wherein the first end tip of the straight spring is hooked around a first full coil from the second end tip of the straight spring.

9. The method of claim 5, wherein the first end tip of the straight spring is hooked around a first full coil from the second end tip of the straight spring.

10. The method of claim 4, wherein said joining step comprises welding.

11. The method of claim 10, wherein said welding is spot welding.

12. The method of claim 5, wherein said joining step comprises welding.

13. The method of claim 12, wherein said welding is spot welding.

14. The method of claim 4, wherein said joining step comprises soldering.

15. The method of claim 5, wherein said joining step comprises soldering.

16. The method of claim 4, wherein said joining step comprises gluing.

17. The method of claim 5, wherein said joining step comprises gluing.

* * * * *